United States Patent Office 3,346,448
Patented Oct. 10, 1967

3,346,448
HEXAFLUOROISOPROPYL ETHERS AS ANESTHETICS
Everett E. Gilbert and Benjamin Veldhuis, Morris Township, Morris County, N.J., assignors to Allied Chemical Corporation, New York, N.Y., a corporation of New York
No Drawing. Filed Sept. 14, 1965, Ser. No. 487,298
4 Claims. (Cl. 167—52)

This invention relates to novel stable ethers, particularly useful as general inhalation anesthetics. More specifically, the application relates to 1,1,1,3,3,3-hexafluoroisopropyl methyl and ethyl ethers.

The methyl and ethyl ethers of this invention are readily prepared by reacting an aqueous solution of hexafluoroisopropanol with sodium hydroxide and then with dimethyl or diethyl sulfate at temperature of about 0° to 60° C. The resulting oil layer is separated, dried and distilled to give the desired ether product.

The following examples will serve to illustrate preparation of the methyl and ethyl ethers of this invention. In the examples, parts are by weight.

EXAMPLE 1

*Production of hexafluoroisopropyl methyl ether*

A mixture of 84 parts of 1,1,1,3,3,3-hexafluoroisopropanol, 180 parts of water and 40 parts of 50% aqueous sodium hydroxide were mixed at 5° C. in a reaction vessel provided with a mechanical stirrer. 63 parts of dimethyl sulfate were added dropwise to the mixture over a ½ hour period with stirring, while allowing the temperature to rise to 25° C. The resulting mixture was stirred at room temperature for 2 hours and was then distilled to give 80.2 parts of crude hexafluoroisopropyl methyl ether. The crude ether was dried over anhydrous sodium sulfate and then redistilled to give 52.3 parts of relatively pure 1,1,1,3,3,3-hexafluoroisopropyl methyl ether boiling at 50–50.5° C.

Infrared spectrographic analysis of the ether product showed an ether absorption band at 10.1 microns and CF absorption bands at 7.7–9.2 microns.

EXAMPLE 2

The method of Example 1 was repeated using 210 parts of hexafluoroisopropanol, 450 parts of water, 100 parts of 50% aqueous sodium hydroxide and 157.5 parts of dimethyl sulfate. A yield of 206.5 parts of crude 1,1,1,3,3,3-hexafluoroisopropyl methyl ether was obtained. After washing with dilute aqueous base and distilling, 1,1,1,3,3,3-hexafluoroisopropyl methyl ether of 99% purity was obtained, as indicated by vapor-liquid chromatography.

Elemental analysis of the ether product was as follows: Calculated: Fluorine, 62.5%; hydrogen, 2.20%. Found: Fluorine, 60.0%; hydrogen, 2.15%.

EXAMPLE 3

The method of Example 1 was followed using 252 parts of hexafluoroisopropanol, 540 parts of water, 120 parts of 50% aqueous sodium hydroxide and 189 parts of dimethyl sulfate. The product was washed with aqueous potassium hydroxide and then with water to give 238 parts of crude 1,1,1,3,3,3-hexafluoroisopropyl methyl ether (88% of theory). The crude ether was distilled over 85% sulfuric acid to give 205.1 parts of 1,1,1,3,3,3-hexafluoroisopropyl methyl ether having a purity of 98.9% and a boiling point of 50–50.5° C.

EXAMPLE 4

*Production of 1,1,1,3,3,3-hexafluoroisopropyl ethyl ether*

A mixture of 84 parts of hexafluoroisopropanol, 180 parts of water and 40 parts of 50% aqueous sodium hydroxide were mixed at 5° C. in a reaction vessel equipped with a mechanical stirrer. 77 Parts of diethyl sulfate were added to the mixture over a 15 minute period at 8° to 12° C., followed by heating and stirring to 70° C. The resulting mixture was cooled to obtain aqueous and organic layers. The organic layer was separated, water-washed and dried with calcium chloride to give 71 parts of crude 1,1,1,3,3,3-hexafluoroisopropyl ethyl ether. The crude ether was then distilled to give relatively pure 1,1,1,3,3,3-hexafluoroisopropyl ethyl ether boiling at 63–65° C. This ether was then washed with aqueous potassium hydroxide, dried and redistilled at 64–5° C.

Infrared spectrographic analysis of the ether product showed an ether absorption band at 9.7 microns and CF absorption bands at 7.7–9.2 microns.

Elemental analysis of the product was as follows: Calculated: Fluorine, 58.1%; hydrogen, 3.06%. Found: Fluorine, 58.4%; hydrogen, 2.97%.

As indicated above, the methyl and ethyl ethers of this invention have been found to be useful as general inhalation anesthetics when administered to anesthetic-susceptible organisms. This utility was completely unexpected since an isomer of the methyl ether, "Indoklon" (hexafluorodiethyl ether), has no anesthetic effect but is, on the other hand, an inhalant convulsant (American Medical Association, March 29, 1958, 1555–1562).

The ethers of this invention were evaluated as inhalation anesthetics by a test similar to that described by Robbins, J. Pharmacol. Exper. Therap., 86, 197–204 (1946). The test employed is as follows:

Ten mice (five in each of two 6.3 liter animal jars) were used for each dose level. A minimum of three graded doses, injected at 0.1 ml. per 10 seconds, were used to establish that dose which caused 50% of the mice to lose the righting reflex in five minutes. The concentration of anesthetic vapor in the jar was calculated using the ideal gas law [see Carson et al., Anesthesiology, 23, 187 (1962)]. The "$AD_{50}$" (volume percent of compound required to anesthetize 50% of the mice used) was determined by plotting the data on log-probit graph paper [see Miller et al., Proc. Soc. Exp. Biol. and Med., 57, 261 (1944)]. Essentially the same experimental procedure was used to determine the "$LD_{50}$" (dosage required to kill 50% of the mice).

The $AD_{50}$ obtained upon testing the methyl and ethyl ethers of this invention was 2.23 and 1.80, respectively, and the $LD_{50}$ obtained was 9.86 and 7.87, respectively. the "AI" (anesthetic index=$LD_{50} \div AD_{50}$) was, therefore, 4.4 in the case of each ether. The AI is a measure of the margin of toxic safety of the compound tested; the higher the number, the less toxic the compound relative to the dosage needed to induce anesthesia. The three most highly developed fluorine-containing anesthetics ["Fluomar" (trifluoroisopropyl vinyl ether); "Roflurane" (2-bromo-2-fluoro-1,1-difluoroethyl ether); "Penthrane" (2,2-dichloro-1,1-difluoroethyl ether)] have AI values in the range of 3.3 to 4.5. It is apparent, therefore, that the ethers of this invention possess low toxicity.

We claim:
1. 1,1,1,3,3,3-hexafluoroisopropyl methyl ether.
2. The process which comprises administering a compound selected from the group consisting of 1,1,1,3,3,3-hexafluoroisopropyl methyl ether and 1,1,1,3,3,3-hexafluoroisopropyl ethyl ether to anesthetic-susceptible organisms as a general inhalation anesthetic.
3. The process which comprises administering 1,1,1,3,3,3-hexafluoroisopropyl methyl ether to anesthetic-susceptible organisms as a general inhalation anesthetic.
4. The process which comprises administering 1,1,1,3,3,3-hexafluoroisopropyl ethyl ether to anesthetic-susceptible organisms as a general inhalation anesthetic.

References Cited

Chemical Abstracts 50–13717 fg (1956).
Chemical Abstracts 53–9064c (1959).
GoLu et al., Anesthesiology, vol. 14, pp. 466–672., September, 1963.
Ling et al., Survey of Anesthesiology, June 1961, pp. 248 and 249.

ALBERT T. MEYERS, *Primary Examiner.*

JULIAN S. LEVITT, SAM ROSEN, *Examiners.*

J. D. GOLDBERG, *Assistant Examiner.*